US012407182B2

(12) United States Patent
Kuo

(10) Patent No.: US 12,407,182 B2
(45) Date of Patent: Sep. 2, 2025

(54) BACKUP POWER SUPPLY WITH CHARGE CONTROL

(71) Applicant: Quanta Computer Inc., Taoyuan (TW)

(72) Inventor: Hsin-Chih Kuo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 12 days.

(21) Appl. No.: 18/594,510

(22) Filed: Mar. 4, 2024

(65) Prior Publication Data

US 2025/0233447 A1 Jul. 17, 2025

(30) Foreign Application Priority Data

Jan. 12, 2024 (TW) ................................ 113101337

(51) Int. Cl.
*H02J 9/06* (2006.01)
*H02J 7/00* (2006.01)

(52) U.S. Cl.
CPC .......... *H02J 9/062* (2013.01); *H02J 7/00712* (2020.01); *H02J 2207/20* (2020.01)

(58) Field of Classification Search
CPC ..... H02J 9/062; H02J 7/00712; H02J 2207/20
USPC ........................................................... 307/66
See application file for complete search history.

(56) References Cited

U.S. PATENT DOCUMENTS

2002/0006536 A1* 1/2002 Liu .................. H01M 8/04753 429/416
2005/0099750 A1 5/2005 Takahashi et al.
2010/0237828 A1* 9/2010 Maegawa ............ H02J 7/0018 320/118
2013/0026836 A1* 1/2013 Dighrasker ......... H02M 3/1582 307/66
2014/0111005 A1* 4/2014 Liu ......................... H02J 9/062 307/20
2021/0066956 A1 3/2021 Izawa et al.
2022/0407344 A1* 12/2022 Cha ....................... H02J 7/0068

FOREIGN PATENT DOCUMENTS

WO 2022094904 A1 5/2022

OTHER PUBLICATIONS

TW Office Action dated 2025-03-18 in Taiwan application No. 113101337.
Search Report issued in TW Office Action dated Mar. 18, 2025 in Taiwan application No. 113101337.

* cited by examiner

*Primary Examiner* — Michael R. Fin
(74) *Attorney, Agent, or Firm* — McClure, Qualey & Rodack, LLP

(57) ABSTRACT

A power supply device includes a main battery, a backup battery, a first charge circuit, a second charge circuit, a first transistor, a second transistor, a switch element, and a control circuit. The first transistor has a control terminal for receiving a first control voltage, a first terminal coupled to the main battery, and a second terminal coupled to a first supply node. The second transistor has a control terminal for receiving a second control voltage, a first terminal coupled to the backup battery, and a second terminal coupled to a midway node. The switch element selectively couples the midway node to a second supply node according to a third control voltage. The control circuit monitors a first supply voltage at the first supply node, and generates the third control voltage according to the first supply voltage.

9 Claims, 2 Drawing Sheets

BACKUP POWER SUPPLY WITH CHARGE CONTROL

CROSS REFERENCE TO RELATED APPLICATIONS

This application claims priority of Taiwan Patent Application No. 113101337 filed on Jan. 12, 2024, the entirety of which is incorporated by reference herein.

BACKGROUND OF THE INVENTION

Field of the Invention

The disclosure generally relates to a power supply device, and more specifically, to a power supply device with high output stability.

Description of the Related Art

If the AC (Alternating Current) power source or the main battery of a conventional power supply device is removed, an instant power shut-down event may occur, which may result in inconvenience for the user. Accordingly, there is a need to propose a novel solution for solving this problem of the prior art.

BRIEF SUMMARY OF THE INVENTION

In an exemplary embodiment, the invention is directed to a power supply device for providing electric power to a system end. The power supply device includes a main battery, a backup battery, a first charge circuit, a second charge circuit, a first transistor, a second transistor, a switch element, and a control circuit. The first charge circuit is coupled to a first supply node, and is configured to generate a first control voltage. The first charge circuit selectively receives an AC (Alternating Current) voltage. The first transistor has a control terminal for receiving the first control voltage, a first terminal coupled to the main battery, and a second terminal coupled to the first supply node. The second charge circuit is coupled between a midway node and the first supply node, and is configured to generate a second control voltage. The second transistor has a control terminal for receiving the second control voltage, a first terminal coupled to the backup battery, and a second terminal coupled to the midway node. The switch element selectively couples the midway node to a second supply node according to a third control voltage. The control circuit monitors a first supply voltage at the first supply node. The control circuit also generates the third control voltage according to the first supply voltage.

In some embodiments, if the first supply voltage is higher than or equal to the threshold voltage, the switch element will be opened. If the first supply voltage is lower than the threshold voltage, the switch element will be closed.

In some embodiments, the first charge circuit is a buck converter.

In some embodiments, the second charge circuit is a buck-boost converter.

In some embodiments, each of the first transistor and the second transistor is an NMOSFET (N-type Metal Oxide Semiconductor Field Effect Transistor).

In some embodiments, the power supply device further includes a first diode. The first diode has an anode coupled to the first supply node, and a cathode coupled to the system end.

In some embodiments, the power supply device further includes a second diode. The second diode has an anode coupled to the second supply node, and a cathode coupled to the system end.

In some embodiments, if the first charge circuit receives the AC voltage, the system end will be supplied by the first supply voltage at the first supply node.

In some embodiments, if the first charge circuit does not receive any AC voltage and the main battery is enabled or operating normally, the system end will be supplied by the first supply voltage at the first supply node, and the first supply voltage will be generated by the main battery.

In some embodiments, if the first charge circuit does not receive any AC voltage and the main battery is disabled or removed, the system end will be supplied by a second supply voltage at the second supply node, and the second supply voltage will be generated by the backup battery.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
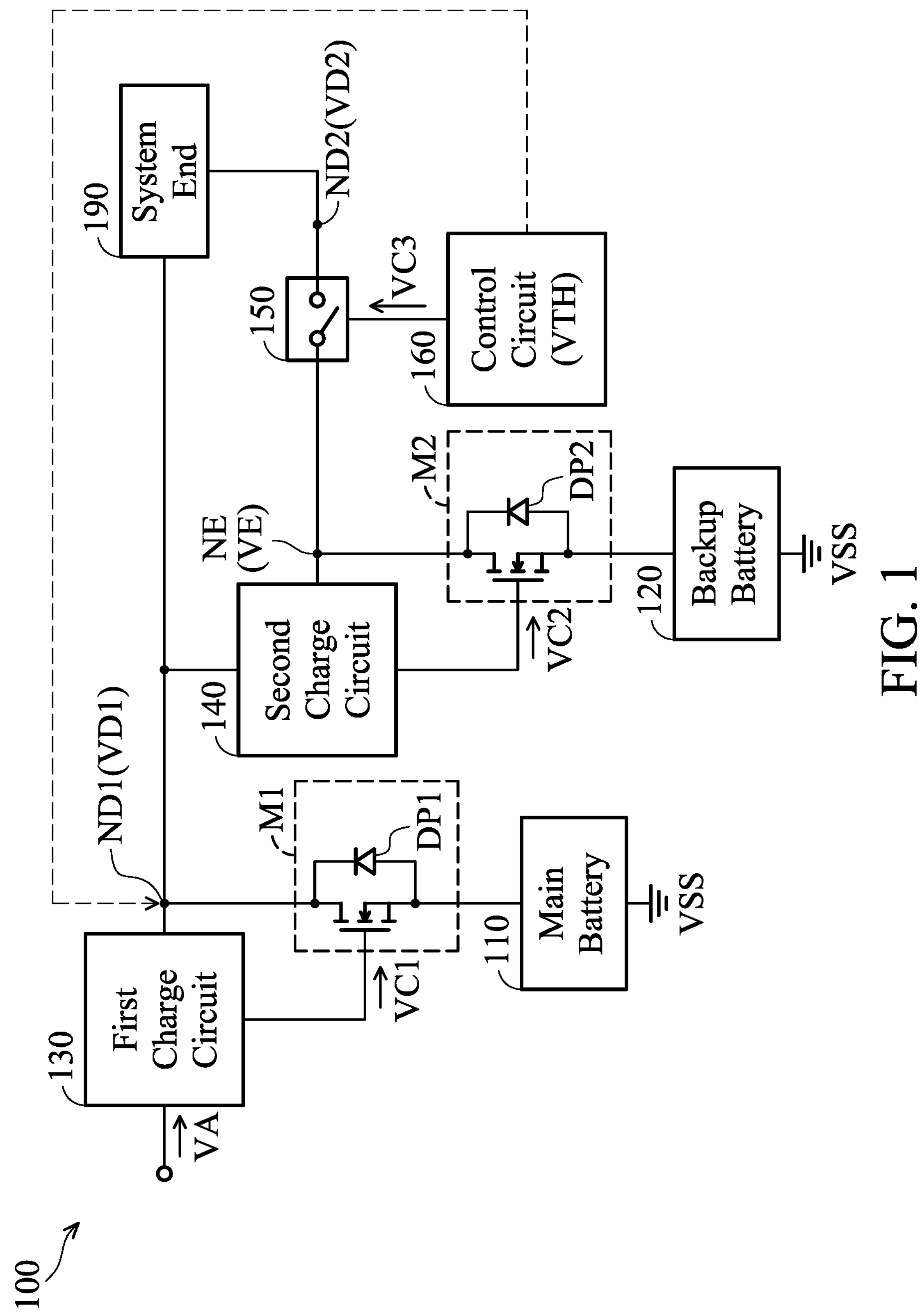
FIG. 1 is a diagram of a power supply device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a power supply device 100 according to an embodiment of the invention. As shown in FIG. 1, the power supply device 100 includes a main battery 110, a backup battery 120, a first charge circuit 130, a second charge circuit 140, a switch element 150, a control circuit 160, a first transistor M1, and a second transistor M2. It should be noted that the power supply device 100 may further include other components, such as a processor, a touch control module, a speaker, and/or a device housing, although they are not displayed in FIG. 1.

The power supply device 100 can provide electric power to a system end 190. For example, the system end 190 may be a tablet computer or a notebook computer, but it is not limited thereto. It should be understood that the system end 190 is an external device, which does not belong to any portion of the power supply device 100.

Both of the main battery 110 and the backup battery 120 store electric energy, and they are coupled to a ground voltage VSS. The types and styles of the main battery 110 and the backup battery 120 are not limited in the invention. In some embodiments, the main battery 110 has a relatively large battery capacity, and the backup battery 120 has a relatively small battery capacity.

The first charge circuit 130 is coupled to a first supply node ND1, and is configured to generate a first control voltage VC1. It should be noted that the first charge circuit 130 can selectively receive an AC (Alternating Current) voltage VA. In some embodiments, the first charge circuit 130 is a buck converter. For example, the first charge circuit 130 may convert the AC voltage VA into a first supply voltage VD1 at the first supply node ND1. The DC (Direct Current) level of the first supply voltage VD1 may be lower than the RMS (Root Mean Square) level of the AC voltage VA.

In some embodiments, the first transistor M1 is an NMOSFET (N-type Metal Oxide Semiconductor Field Effect Transistor). Specifically, the first transistor M1 has a control terminal (e.g., a gate) for receiving the first control voltage VC1, a first terminal (e.g., a source) coupled to the main battery 110, and a second terminal (e.g., a drain) coupled to the first supply node ND1. In addition, a first body diode DP1 may be built in the first transistor M1. The first body diode DP1 has an anode coupled to the main battery 110, and a cathode coupled to the first supply node ND1.

In some embodiments, the first charge circuit 130 usually outputs the first control voltage VC1 with a high logic level (or a logic “1”) for enabling the first transistor M1. In alternative embodiments, the first charge circuit 130 outputs the first control voltage VC1 with a low logic level (or a logic “0”) for disabling the first transistor M1, and it is often used to prevent the main battery 110 from being overcharged.

The second charge circuit 140 is coupled between a midway node NE and the first supply node ND1, and is configured to generate a second control voltage VC2. In some embodiments, the second charge circuit 140 is a buck-boost converter. For example, the second charge circuit 140 may convert the first supply voltage VD1 into a midway voltage VE at the midway node NE. The DC level of the midway voltage VE may be higher or lower than the DC level of the first supply voltage VD1.

In some embodiments, the second transistor M2 is another NMOSFET. Specifically, the second transistor M2 has a control terminal (e.g., a gate) for receiving the second control voltage VC2, a first terminal (e.g., a source) coupled to the backup battery 120, and a second terminal (e.g., a drain) coupled to the midway node NE. In addition, a second body diode DP2 may be built in the second transistor M2. The second body diode DP2 has an anode coupled to the backup battery 120, and a cathode coupled to the midway node NE.

In some embodiments, the second charge circuit 140 usually outputs the second control voltage VC2 with a high logic level for enabling the second transistor M2. In alternative embodiments, the second charge circuit 140 outputs the second control voltage VC2 with a low logic level for disabling the second transistor M2, and it is often used to prevent the backup battery 120 from being overcharged.

The switch element 150 can selectively couple the midway node NE to a second supply node ND2 according to a third control voltage VC3. In some embodiments, if the third control voltage VC3 has a high logic level, the switch element 150 will be closed, so as to couple the midway node NE to the second supply node ND2. At this time, a second supply voltage VD2 at the second supply node ND2 may be substantially equal to the midway voltage VE. In alternative embodiments, if the third control voltage VC3 has a low logic level, the switch element 150 will be opened, so as to decouple the midway node NE from the second supply node ND2. At this time, the second supply voltage VD2 at the second supply node ND2 has nothing to do with the midway voltage VE.

For example, the control circuit 160 may be implemented with an MCU (Microcontroller Unit), and it may include a detection module and a comparison module (not shown). The control circuit 160 can monitor the first supply voltage VD1 at the first supply node ND1. The control circuit 160 can also generate the third control voltage VC3 according to the first supply voltage VD1. Specifically, the control circuit 160 can compare the first supply voltage VD1 with the threshold voltage VTH, and then determine the third control voltage VC3 based on the comparison result. In some embodiments, if the first supply voltage VD1 is higher than or equal to the threshold voltage VTH, the control circuit 160 will output the third control voltage VC3 with a low logic level, such that the switch element 150 will be opened. In alternative embodiments, if the first supply voltage VD1 is lower than the threshold voltage VTH, the control circuit 160 will output the third control voltage VC3 with a high logic level, such that the switch element 150 will be closed. For example, the threshold voltage VTH may be about 5V, 7V or 8V, but it is not limited thereto.

Generally, the power supply device 100 may be operated in either an AC mode, a main mode, or a backup mode, and they will be described in the following embodiments.

In the AC mode, if the first charge circuit 130 receives the AC voltage VA, the system end 190 will be supplied by the first supply voltage VD1 at the first supply node ND1. At this time, the first supply voltage VD1 is generated by the first charge circuit 130 according to the AC voltage VA, and the midway voltage VE is generated by the second charge circuit 140 according to the first supply voltage VD1. Furthermore, the main battery 110 can be charged by using the first supply voltage VD1, and the backup battery 120 can be charged by using the midway voltage VE. It should be noted that because the switch element 150 is opened in the AC mode, the second supply node ND2 of the power supply device 100 cannot be arranged to provide any electric power to the system end 190.

In the main mode, if the first charge circuit 130 does not receive any AC voltage VA and the main battery 110 is enabled or operating normally, the system end 190 will be supplied by the first supply voltage VD1 at the first supply node ND1. At this time, the first supply voltage VD1 is generated by the main battery 110, and the midway voltage VE is generated by the second charge circuit 140 according to the first supply voltage VD1. Furthermore, the main battery 110 can perform a discharge operation to provide the first supply voltage VD1, and the backup battery 120 can be charged by using the midway voltage VE. It should be noted that because the switch element 150 is opened in the main mode, the second supply node ND2 of the power supply device 100 cannot be arranged to provide any electric power to the system end 190.

In the backup mode, if the first charge circuit 130 does not receive any AC voltage VA and the main battery 110 is disabled or removed, the system end 190 will be supplied by the second supply voltage VD2 at the second supply node ND2. It should be noted that since the first supply voltage VD1 at the first supply node ND1 fast drops, the switch element 150 is closed in the backup mode. The backup battery 120 can perform another discharge operation to provide the midway voltage VE. The second supply voltage VD2 may be substantially equal to the midway voltage VE. That is, the second supply voltage VD2 is generated by the backup battery 120.

With the design of the invention, the proposed power supply device 100 can support the function of hot swap. In other words, even if the main battery 110 is disabled or temporarily removed, the power supply device 100 can still provide electric power by using the backup battery 120, and it does not need to use any AC power source. Also, a first auxiliary current path of the main battery 110 can be formed by the first body diode DP1 of the first transistor M1, and a second auxiliary current path of the backup battery 120 can be formed by the second body diode DP2 of the second transistor M2. In other words, since the power supply device 100 of the invention provides very high output stability, it can significantly reduce the probability of the system end 190 being unexpectedly shut down.

Figure 2:
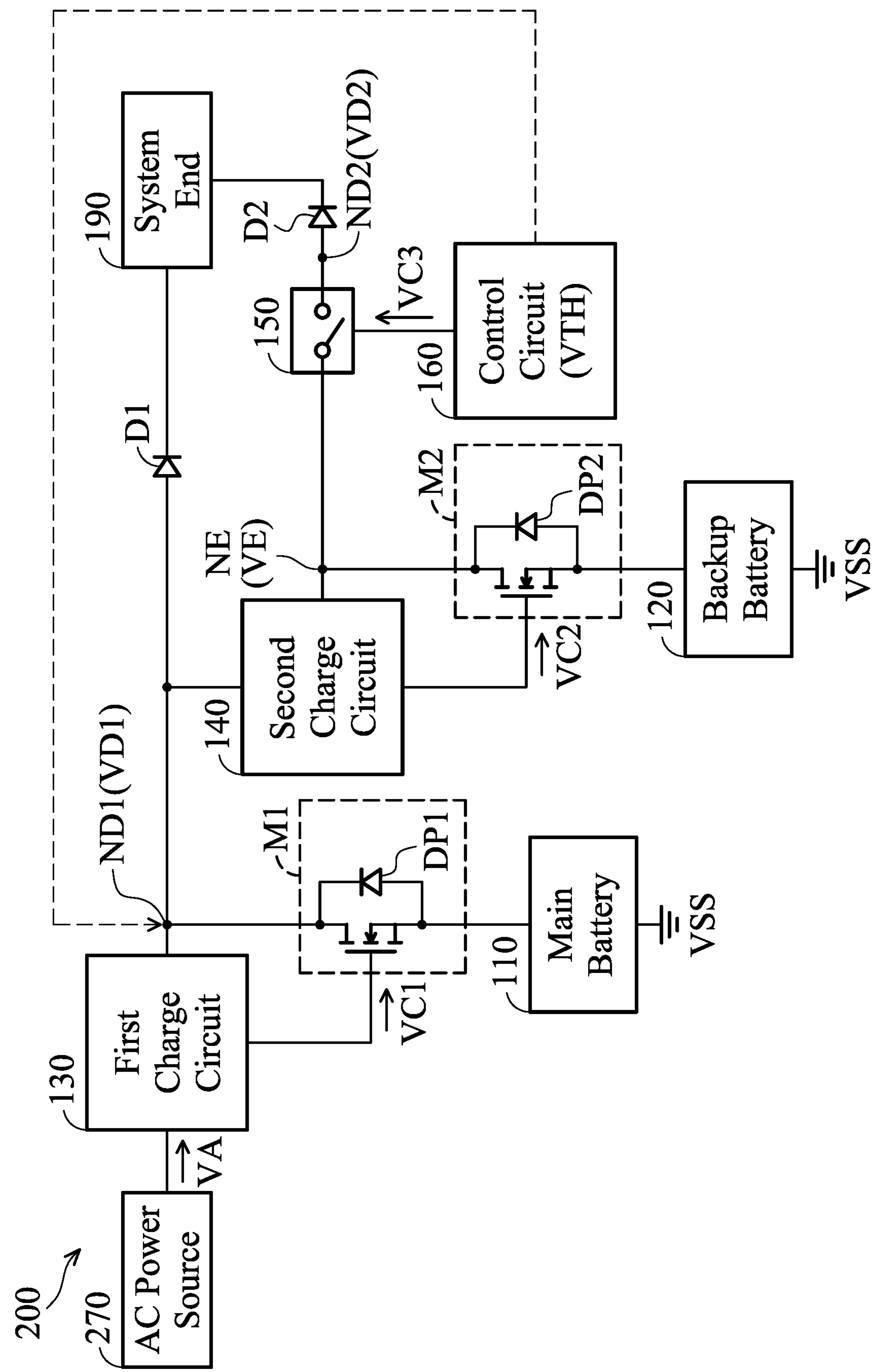
FIG. 2 is a diagram of a power supply device according to another embodiment of the invention.

FIG. 2 is a diagram of a power supply device 200 according to another embodiment of the invention. FIG. 2 is similar to FIG. 1. In the embodiment of FIG. 2, the power supply device 200 further includes a first diode D1 and a second diode D2. Specifically, the first diode D1 has an anode coupled to the first supply node ND1, and a cathode coupled to the system end 190. The second diode D2 has an anode coupled to the second supply node ND2, and a cathode coupled to the system end 190. According to practical measurements, the incorporation of the first diode D1 and the second diode D2 helps to effectively enhance the isolation between the first supply node ND1 and the second supply node ND2. In addition, the AC voltage VA can be provided by an AC power source 270, which does not belong any portion of the power supply device 200. For example, if the first charge circuit 130 is coupled to the AC power source 270, the first charge circuit 130 may receive the AC voltage VA. Conversely, if the first charge circuit 130 is decoupled from the AC power source 270 or the AC power source 270 is removed, the first charge circuit 130 may not receive any AC voltage VA. Other features of the power supply device 200 of FIG. 2 are similar to those of the power supply device 100 of FIG. 1. Thus, the two embodiments can achieve similar levels of performance.

The invention proposes a novel power supply device. According to practical measurements, the power supply device using the aforementioned design has at least the advantages of supporting the hot swap and enhancing the output stability, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-2. The invention may merely include any one or more features of any one or more embodiments of FIGS. 1-2. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device for providing electric power to a system end, comprising:

a main battery;

a backup battery;

a first charge circuit, coupled to a first supply node, and generating a first control voltage, wherein the first charge circuit selectively receives an AC (Alternating Current) voltage;

a first transistor, wherein the first transistor has a control terminal for receiving the first control voltage, a first terminal coupled to the main battery, and a second terminal coupled to the first supply node;

a second charge circuit, coupled between a midway node and the first supply node, and generating a second control voltage;

a second transistor, wherein the second transistor has a control terminal for receiving the second control voltage, a first terminal coupled to the backup battery, and a second terminal coupled to the midway node;

a switch element, selectively coupling the midway node to a second supply node according to a third control voltage; and a control circuit, monitoring a first supply voltage at the first supply node, wherein the control circuit generates the third control voltage according to the first supply voltage;

wherein each of the first transistor and the second transistor is an NMOSFET (N-type Metal Oxide Semiconductor Field Effect Transistor).

2. The power supply device as claimed in claim 1, wherein if the first supply voltage is higher than or equal to a threshold voltage, the switch element is opened, and if the first supply voltage is lower than the threshold voltage, the switch element is closed.

3. The power supply device as claimed in claim 1, wherein the first charge circuit is a buck converter.

4. The power supply device as claimed in claim 1, wherein the second charge circuit is a buck-boost converter.

5. The power supply device as claimed in claim 1, further comprising:

a first diode, wherein the first diode has an anode coupled to the first supply node, and a cathode coupled to the system end.

6. The power supply device as claimed in claim 5, further comprising:

a second diode, wherein the second diode has an anode coupled to the second supply node, and a cathode coupled to the system end.

7. The power supply device as claimed in claim 1, wherein when the first charge circuit receives the AC voltage, the system end is supplied by the first supply voltage at the first supply node.

8. The power supply device as claimed in claim 1, wherein when the first charge circuit does not receive any AC voltage and the main battery is enabled or operating normally, the system end is supplied by the first supply voltage at the first supply node, and the first supply voltage is generated by the main battery.

9. The power supply device as claimed in claim 1, wherein when the first charge circuit does not receive any AC voltage and the main battery is disabled or removed, the system end is supplied by a second supply voltage at the second supply node, and the second supply voltage is generated by the backup battery.

* * * * *